(12) United States Patent
Burd

(10) Patent No.: US 8,727,069 B1
(45) Date of Patent: May 20, 2014

(54) OSCILLATING TUBE HAVING A SEGMENTED COATING FOR DAMPING THE TUBE

(71) Applicant: United Technologies Corporation, Hartford, CT (US)

(72) Inventor: Steven W. Burd, Cheshire, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/705,942

(22) Filed: Dec. 5, 2012

(51) Int. Cl.
*F16L 11/26* (2006.01)

(52) U.S. Cl.
USPC .......................................................... 181/207

(58) Field of Classification Search
USPC .................................. 181/207, 222, 252, 256
See application file for complete search history.

(56) References Cited

U.S. PATENT DOCUMENTS

| 5,452,577 A * | 9/1995 | Langer ............................. 60/299 |
| 6,689,440 B2 * | 2/2004 | Hsieh et al. ................. 428/36.91 |
| 7,063,181 B1 * | 6/2006 | Cunningham ................. 181/233 |
| 7,399,533 B2 | 7/2008 | Zheng et al. |
| 2010/0247947 A1 | 9/2010 | Tamura et al. |

* cited by examiner

*Primary Examiner* — Jeremy Luks
(74) *Attorney, Agent, or Firm* — Malcolm J. Chisholm, Jr.

(57) ABSTRACT

The oscillating tube (10) includes a first end (12), an opposed second end (16), and a fluid conduit (18) defined by the tube extending between the opposed ends (12, 16). A segmented damping coating (20) covers in intimate contact a covered or coated portion (22) of the tube (10) so that the coated portion (22) of the tube includes at least about ten percent of an axial length of the tube and an uncoated portion (34, 36) that is not covered by the segmented damping coating (22) includes greater than about ten percent of an axial length of the tube (10). The segmented damping coating (20) may include polymers, polytetrafluoroethylene, single composition polymers, ceramic fibers, polymer fibers, reinforced polymer fibers including a polytetrafluoroethylene, ceramics, including monolithic and matrix ceramics, thermoplastics, carbon/graphic materials, silicon materials, metal rings or clamps, and combinations thereof.

16 Claims, 1 Drawing Sheet

OSCILLATING TUBE HAVING A SEGMENTED COATING FOR DAMPING THE TUBE

STATEMENT REGARDING FEDERALLY SPONSORED RESEARCH OR DEVELOPMENT

This disclosure was made with Government support under contract number N00019-02-C-3003 awarded by the United States NAVY. The Government has certain rights in this disclosure.

TECHNICAL FIELD

The present disclosure relates to oscillating tubes, such as fluid distribution tubes. in gas turbine engines that are subject to oscillating frequencies and resulting high-cycle fatigue, and relates in particular to a coating partially covering the tubes to dampen the oscillations.

BACKGROUND ART

In the field of gas turbine. engines it is known that extended length tubes are used to provide various fluids such as fuel, oil. and air, etc. to many components of the engines. Additionally, major systems of the engines include extensive use of tubes for delivering and controlling fluids. Such tubes are typically constructed of thin wall and/or small diameter tubing of nickel alloys and other durable aerospace materials. Typically such tubes include ends that are attached to other engine components, such as manifolds, fuel spray bars, etc., through welds, brazes, tube connectors, fittings, etc. Often, the tubes are integrated within complex gas turbine engine operation systems during manufacturing and assembly of the systems, and are not simply secured between two engine components. An exemplary engine system using integrated oscillating tubes includes combustion fuel nozzles or fuel spray rings that may have multiple and/or complex oscillating tubes that have differing connections on opposed ends of the As a result of typical geometries of such tubes that commonly have long spans, long aspect ratios, and small diameters, the tubes are susceptible to high-cycle fatigue. In other words, in a normal operating cycle of a gas turbine engine, the engine generates very high frequency vibrations or oscillations as a result of rotation of compressors, turbines as well as interactions with other the engine system as a whole. These forced vibrations and related acoustics or atmospheric waves result in high frequency oscillations within the tubes. The high frequency vibrations are typically measured in Hertz ("Hz", meaning cycles per second) and may range from 60 Hz (at sub-idle of a gas turbine engine) to 600 Hz (at high-speed operation) and may range as hick as 2,000 Hz. (For purposes herein, the phrase "oscillating tube" is to mean that a tube is subject to between about 60 Hz and about 2,000 Hz.)

Efforts have been undertaken to protect tubes that transfer critical fluids in complex machinery. For example, U.S. Pat. No. 7,309,533 to Zheng et al. that issued on Jul. 15, 2008 discloses use of a protective sleeve around brake tubes and fuel lines for automobiles. Such a sleeve consists primarily of a polyvinylidene fluoride polymer and related complex resins. However, the coating or sleeve was developed to provide the tube by providing resistance to chemical damage, mechanical impact, corrosion and heat stresses. Therefore, the Zheng et al. sleeve encases an entire tube. U.K. Patent Application bearing Publication No. GB 2080474A that was published on Feb. 3, 1982 discloses a fuel line in a gas turbine engine having a slightly larger pipe surrounding the fuel line to produce a gap for collecting any fuel passing out of the fuel line. To protect and lubricate the fuel line from mechanical damage from the outer-larger pipe during assembly, bending and usage, the inner fuel line is coated with a thick layer of polytetrafluoroethylene. As with Zheng et al., however, this coating is for protecting the inner fuel line and/or an interior of the outer pipe, and therefore covers the entire fuel line or the entire interior surface of the outer pipe. While such critical fluid transmitting tubes are known to have been covered with a polymer for the above described protection, to achieve their goals, such coverings require coating an entire tube from end to end. Additionally, such a complete tube coating presents serious challenges to covering any such oscillating tubes that are pre-assembled or integrated within complex systems of the engine.

Therefore, there is a need for a coating applicable to oscillating tubes that may be efficiently applied to the tubes while minimizing costs and labor requirements in applying the coating, and wherein the coated tube minimizes disruption in assembly and usage of the tube.

SUMMARY OF THE INVENTION

The disclosure includes an oscillating tube having a segmented coating for damping the tube. The oscillating tube includes a first end, an opposed second end, and a fluid conduit defined by the tube extending between the first end and the second end. As an "oscillating tube", the tube is subject to between about 60 Hz and about 2,000 Hz. The segmented coating covers in intimate contact a portion of the oscillating tube. ("Intimate contact" means that there is nothing between the coating and an exterior surface of the tube except a possible intermediate adhesive or bonding agent that forms a mating interface between the coating and the tube.) The covered portion of the tube includes at least about ten percent ("10%") of a total axial length of the tube extending between the first end and the second end of the tube. Additionally, the tube includes at least one uncoated portion not covered by the segmented damping coating. The uncoated portion of the tube includes greater than about ten percent of an axial length of the tube.

The oscillating tube may be configured so that the uncoated portion of the tube includes one or both of the first end and the second end of the oscillating. The oscillating tube may also be arranged so that the uncoated portion includes one of a linear segment, a radial segment, and a linear and a radial segment. The linear segment extends parallel to a direction of flow of fluids through the tube and also extends adjacent a coated portion of the tube along the linear segment. The radial segment extends at least partially around the tube in a direction perpendicular to the flow of fluids through the tube.

The segmented coating for damping the tube is composed of material selected from the group consisting of polymers, polytetrafluoroethylene, single composition polymers, ceramic fibers, polymer fibers, reinforced polymer fibers including a polytetrafluoroethylene, ceramics, including monolithic and matrix ceramics, thermoplastics, carbon/graphite materials, silicon materials, and combinations thereof. The segmented coating may also include, one or more metal rings or clamps surrounding or partially surrounding the oscillating tube. (For purposes herein, the word "damping" is to mean producing an under-damped status in the oscillating tube so that the tube oscillates at reduced frequency compared to an un-coated or undamped tube and/or the oscillations have a reduced amplitude. More specifically, the word "damping" means that oscillations of the tube are changed to one of: a reduction in the amplitude of the oscillations of at least about ten percent; a reduction in the frequency of the oscillation of about 20 Hz; and, a reduction in the amplitude of the oscillations of at least about ten percent and a reduction in the frequency of the oscillations of about 20 Hz.)

In an embodiment of the disclosure, the coating consists essentially of polytetrafluoroethylene (PTFE). The coating may have a thickness that is no greater than 25 mils (0.025 inches, or approximately 0.636 millimeters ("mm"). In other embodiments, the coating may have a thickness up to 120 mils, which is about one-eighth of an inch, or 0.12 inches, or 3.05 mm. Additionally, the coating is tolerant of temperatures in a range of between about 500° Fahrenheit (500° F.) (260 degrees Celsius (260° C.) and about 700° F. (371.11° C.), while ceramic coatings would be tolerant of much higher temperature ranges. The coating may be applied to the oscillating tube in the farm of shrink tubing, a spiral wrap, spray application, painting a liquid form of the coating upon the tube. The disclosure also includes the coating in the form of sheets, pads or material segments requiring an agent for adhesion to the outer surface of the tube. The coating may also be in the form of ceramic fibers including high-temperature ceramic fibers such as continuous filament ceramic oxide fibers marketed under the trademark "NEXTEL" that are available from the "3M" company of St. Paul, Minn. 55144 U.S.A.; and similar fibers marketed under the trademark "NOMEX" that are available from the E. I. du Pont de Nemours and Company of Wilmington, Del., U.S.A.

The disclosure includes application of the coating to the oscillating tube so that an interruption in the coating, or a non-coated portion of the tube, includes a portion of the tube that defines the linear segment extending parallel to a direction of flow of fluids through the tube, and wherein the linear segment also extends adjacent a coated portion of the tube along the linear segment. The linear segment may be, for example, a linear slit, or a linear segment on a side of the tube contacting the engine and incapable of being coated, while an opposed linear segment not contacting the engine is coated. A non-coated portion of the tube may also define the radial segment, or a portion of a radial segment that extends around the tube in a direction perpendicular to the flow of fluids through the tube. Such a radial segment would be between two coated portions Of the tube adjacent opposed edges of the radial segment.

The oscillating tube may also be secured between two components of a gas turbine engine so that the tube is integral with the engine. Additionally, the oscillating tube may be integrated within an assembly secured within a gas turbine engine.

Therefore, it is a general object of the present disclosure to provide an oscillating tube having a segmented coating for damping the tube that overcomes deficiencies of the prior art.

It is a more specific object of the present disclosure to provide an oscillating tube having a segmented coating for damping the tube that facilitates application of the coating to portions of the tube and that enhances efficiency of usage of the coated tube.

These and other objects and values of the present disclosure will become apparent in the following detailed description and the accompanying drawings.

DESCRIPTION OF THE PREFERRED EMBODIMENTS

Figure 1:
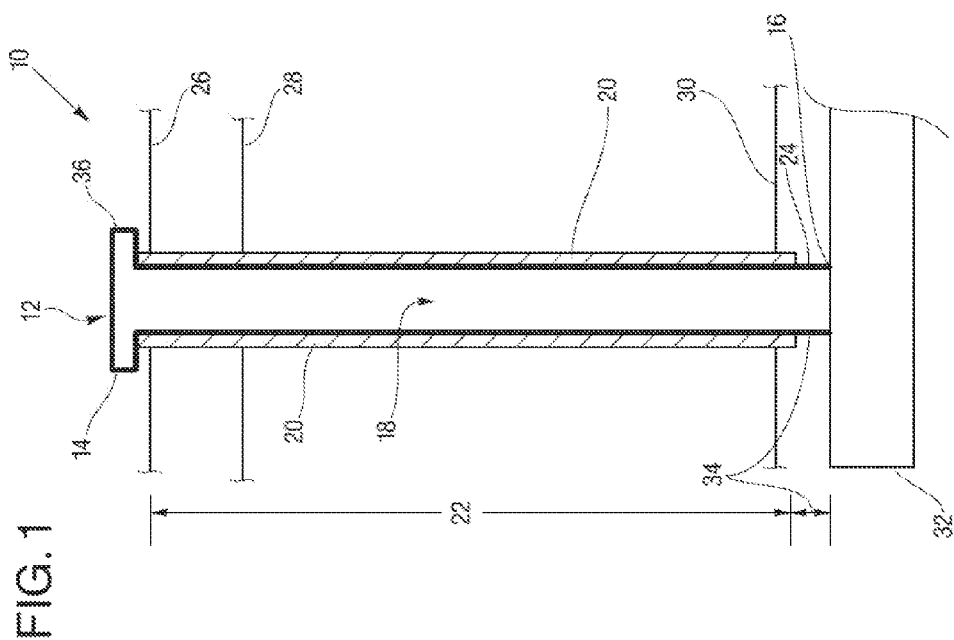
FIG. 1 is a simplified schematic drawing of an oscillating tube having a segmented coating for damping the tube constructed in accordance with the present disclosure.

Referring to the drawings in detail, FIG. 1 shows a simplified, schematic representation of an oscillating tube having a segmented coating for damping the tube, and is generally designated by reference numeral 10. The oscillating tube 10 includes a first end 12, which may be in the form of an expanded fitting 14, and an opposed second end 16. A fluid conduit 18 defined by the tube extends between the first end 12 and the second end 16. (For purposes herein, any oscillating "tube" is a tube that is subject to between about 60 Hz and about 2,000 Hz.) The segmented coating 20 covers in intimate contact a covered portion 22 of the oscillating tube 10. (As described above, "intimate contact" means that there is nothing between the coating 20 and an exterior surface 24 of the tube 10 except a possible intermediate adhesive or bonding agent (not shown) that forms a mating interface between the coating 20 and the tube 10.)

The FIG. 1 simplified schematic representation of the tube 10 shows the tube 10 as a fuel tube 10 that passes through several common layers of a gas turbine engine (not shown). For example, the expanded fitting 14 of the tube 10 may be secured adjacent a bypass duct wall 26, and the tube 10 may then extend from the wall 26 through an outer engine shroud 28 and an inner engine shroud 30 to penetrate into an engine center cavity fuel manifold 32.

To facilitate securing the tube 10 to a component within the engine center cavity 32, the tube 10 may have a first uncoated portion 34 that extends from the coated portion 22 to the second end 16. Additionally, the first end 12 including the expanded fitting 14 may also comprise a second uncoated portion 36. By having the first end 12 or both ends 12, 16 of the tube 10 define a first uncovered or non-coated portion 34 and/or a second non-coated portion 36 of the tube 10, the uncoated tube ends 12, 16 may be more efficiently secured to an engine component 32, such as by welding, brazing or other manufacturing operations without having any disruptions to the quality of the welding or brazing from the segmented coating 20, or without having to first remove the coating 20. The second uncoated portion 36 adjacent the second end 16 of the tube 10 may be characterized as an uncoated radial segment 34 because the second uncoated portion 34 completely surrounds the exterior surface 24 of the tube 10. The covered or coated portion 22 of the tube includes at least about ten percent ("10%") of a total axial length of the tube 10 extending between the first end 12 and the opposed second end 16 of the tube 10. Additionally, the tube 10 includes at least one uncoated portion 34, 36 not covered by the segmented damping coating. The uncoated portion of the tube includes greater than about 10% of an axial length of the tube.

The FIG. 1 embodiment of the oscillating tube 10 represents as common use of such tubes within a gas turbine engine (not shown) operating environment, wherein the tube 10 having the segmented coating 20 may be secured between two engine components, such as a fuel supply (not shown) and a fuel manifold 32 after the manifold 32 is assembled within the engine (not shown). The tube 10 may therefore include two or more un coated portions 34, 36 to facilitate use of the tube 10 while achieving damping of the tube 10 during operation of the engine.

Figure 2:
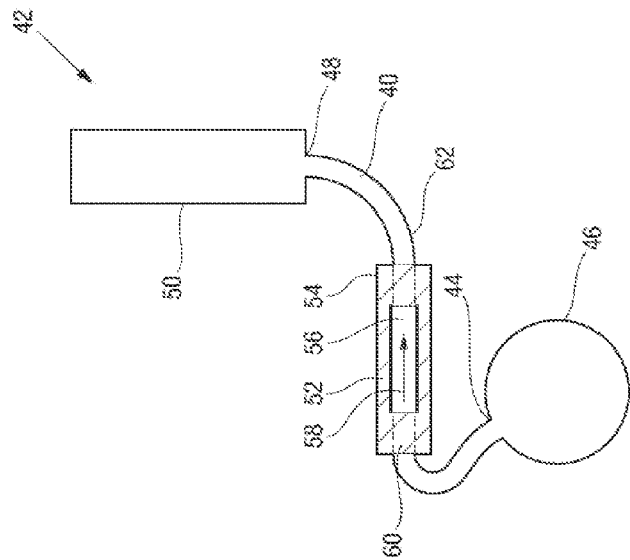
FIG. 2 is a simplified schematic drawing of an alternative embodiment oscillating tube having a segmented coating for damping the tube and showing the tube integrated within an assembly of a gas turbine engine.

FIG. 2 shows an alternative embodiment of an oscillating tube 40, wherein the tube 40 may be integrated within an assembly, such as a fuel spray-bar assembly 42 prior to the assembly 42 being secured within the gas turbine engine (not shown). The oscillating tube 40 may be secured at a first end 44 to a fuel manifold 46 and at a second end 48 to a fuel spray-bar 50. To dampen oscillations of the FIG. 2 tube 40, the tube 40 may include a second segmented coating 52 that covers a coated portion 54. The tube 40 may include a first uncovered portion 56 in the form of a linear segment 56 extending parallel to a direction of flow (represented by directional arrow 58) of fluids through the tube 40. The linear segment 56 also extends adjacent the coated portion 54 of the tube 40 along the linear segment 56. The linear segment 56 may be, for example, a linear slit 56, or a linear segment 56 on a side of the tube 40 contacting an engine component (not shown) and incapable of being coated, while an opposed or adjacent linear portion 60 not contacting the engine (not shown) is coated with the segmented coating 52. The linear segment 56 may also be uncoated to provide a location on the tube 40 for securing an attachment connection (not shown) or a spot for welding a securing bracket, etc. (not shown).

The tubes 10, 40 are most often formed from metallic material. The segmented coating 20, 52 for damping the tubes 10, 40 is composed of material selected from the group consisting of polymers, polytetrafluoroethylene, single composition polymers, ceramic fibers, polymer fibers, reinforced polymer fibers including a polytetrafluoroethylene, and combinations thereof. The segmented coating 20, 52 may also include one or more metal rings 52 or clamps 52 surrounding or partially surrounding the oscillating tube. (As described above, for purposes herein, the word "damping" is to mean producing an under-damped status in the oscillating tube so that the tube oscillates at reduced frequency compared to an un-coated or undamped tube and/or the oscillations have a reduced amplitude. More specifically, the word "damping" means that oscillations of the tube are changed to one of: a reduction in the amplitude of the oscillations of at least about ten percent; a reduction in the frequency of the oscillation of about 20 Hz; and, a reduction in the amplitude of the oscillations of at least about ten percent and a reduction in the frequency of the oscillations of about 20 Hz.)

In an embodiment of the disclosure, the segmented coating 20, 52 consists essentially of polytetrafluoroethylene (PTFE). The coating 20, 52 may have a thickness that is no greater than 25 mils (0.025 inches, or approximately 0.636 millimeters). In other embodiments, the coating may have a thickness up to 120 mils, which is about one-eighth of an inch, or 0.12 inches, or 3.05 mm. Additionally, the coating 20, 52 is preferably tolerant of temperatures in a range of between about 500° Fahrenheit (500° F.) (260 degrees Celsius (260° C.)) and about 700° F. (371.11° C.), while ceramic coatings would be tolerant of much higher temperature ranges. The coating 20, 52 may be applied to the oscillating tube 10, 40 in the form of shrink tubing, a spiral wrap, spray application, painting a liquid form of the coating 20, 52 upon the tube 10, 40. The disclosure also includes the coating 20, 52 in the form of sheets, pads or material segments (not shown) requiring an agent for adhesion to the outer surface 24 of the tube 10. The coating 20, 52 may also be in the form of ceramic fibers including high-temperature ceramic fibers.

By having uncoated portions 34, 36 on the first end 12, 44 the second end 16, 48 or both ends 12, 44, 16, 48 of the tubes 10, 40, the disclosure provides for efficient application of the segmented coating 20, 52 to oscillating tubes 10, 40 after they have been integrated into, or assembled within, various systems of a gas turbine engine (not shown), such as within the fuel spray-bar assembly 42 of FIG. 2. For example, the segmented coating 20, 52 may be applied, such as by spray coating, to an exterior surface 62 of the FIG. 2 oscillating tube 40 exposed on an exterior surface (not shown) of an engine system 42, while an opposed surface (not shown) of the tube 40 that cannot be easily accessed remains uncoated or includes uncoated portions 56.

While the above disclosure has been presented with respect to the described and illustrated embodiments of oscillating tubes having a segmented coating for damping the tube, it is to be understood that the disclosure is not to be limited to those alternatives and described embodiments. Accordingly, reference should be made primarily to the following claims rather than the foregoing description to determine the scope of the disclosure.

What is claimed is:

1. An oscillating tube having a segmented coating for damping the tube, the tube comprising:
   a. the oscillating tube having a first end, an opposed second end and a fluid conduit defined by the tube extending between the first end and the second end, wherein the tube is subject to between about 60 Hz and about 2,000 Hz;
   b. the segmented damping coating covering in intimate contact a portion of the oscillating tube, the coated portion of the tube including at least about ten percent of an axial length of the tube extending between the first end and the second end of the tube, and the tube including at least one uncoated portion not covered by the segmented damping coating, the uncoated portion of the tube including greater than about ten percent of an axial length of the tube; and,
   c. wherein the segmented coating comprises material selected from the group consisting of polymers, polytetrafluoroethylene, single composition polymers, ceramic fibers, polymer fibers, reinforced polymer fibers including a polytetrafluoroethylene, ceramics, including monolithic and matrix ceramics, thermoplastics, carbon/graphite materials, silicon materials, and combinations thereof, tolerant of temperatures in a range of between about 260 degrees Celsius and about 371.11 degrees Celsius and coated on the tube to a thickness that is no greater than about 0.636 millimeters.

2. The oscillating tube of claim 1, wherein the uncoated portion of the tube includes one of a first uncoated portion adjacent the first end of the tube, a second uncoated portion adjacent the second end of the tube and a first uncoated portion adjacent the first end of the tube and a second uncoated portion adjacent the second end of the tube.

3. The oscillating tube of claim 1, wherein the uncoated portion includes one of a linear segment, a radial segment, and a linear and a radial segment, wherein the linear segment extends parallel to a direction of flow of fluids through the tube and also extends adjacent a coated portion of the tube along the linear segment, and wherein the radial segment extends around the tube in a direction perpendicular to the flow of fluids through the tube.

4. The oscillating tube of claim 1, wherein the tube is secured between two components of a gas turbine engine.

5. The oscillating tube of claim 1, wherein the tube is integrated within an assembly secured within a gas turbine engine.

6. A method of damping an oscillating tube, wherein the tube oscillates between about 60 Hz and about 2,000 Hz, the method comprising:
   a. covering in intimate contact a coated portion of the oscillating tube with a segmented damping coating so that the coated portion of the tube includes at least about ten percent of an axial length of the tube extending between the first end and the second end of the tube, and so that an uncovered portion of the tube includes at least one uncoated portion not covered by the segmented damping coating, and the uncoated portion of the tube includes greater than about ten percent of an axial length of the tube; and, b. producing the segmented coating from materials selected from the group consisting of polymers, polytetrafluoroethylene, single composition polymers, ceramic fibers, polymer fibers, reinforced polymer fibers including a polytetrafluoroethylene, ceramics, including monolithic and matrix ceramics, thermoplastics, carbon/graphite materials, silicon materials, and combinations thereof, tolerant of temperatures in a range of between about 260 degrees Celsius and about 371.11 degrees Celsius and coated on the tube to a thickness that is no greater than about 0.636 millimeters.

7. The method of damping an oscillating tube of claim 6, wherein the covering step further comprises covering the tube so that the uncoated portion of the tube includes one of a first uncoated portion adjacent the first end of the tube, a second uncoated portion adjacent the second end of the tube and a first uncoated portion adjacent the first end of the tube and a second uncoated portion adjacent the second end of the tube.

8. The method of damping an oscillating tube of claim 7, wherein the covering step further comprises covering the tube so that the uncoated portion includes one of a linear segment, a radial segment, and a linear and a radial segment, wherein the linear segment extends parallel to a direction of flow of fluids through the tube and also extends adjacent a coated portion of the tube along the linear segment, and wherein the radial segment extends around the tube in a direction perpendicular to the flow of fluids through the tube.

9. The method of damping an oscillating tube of claim 6, further comprising securing the tube between two components of a gas turbine engine.

10. The method of damping an oscillating tube of claim 6, further comprising integrating the tube within an assembly secured within a gas turbine engine.

11. The method of damping an oscillating tube of claim 6, further comprising damping oscillations of the tube to produce one of: a reduction in the amplitude of the oscillations of at least about ten percent; a reduction in the frequency of the oscillations of about 20 Hz; and, a reduction in the amplitude of the oscillations of at least about ten percent and a reduction in the frequency of the oscillations of about 20 Hz.

12. An oscillating tube having a segmented coating for damping the tube, the tube comprising:
   a. the oscillating tube having a first end, an opposed second end and a fluid conduit defined by the tube extending between the first end and the second end, wherein the tube is subject to between about 60 Hz and about 2,000 Hz;
   b. the segmented damping coating covering in intimate contact a portion of the oscillating tube, the coated portion of the tube including at least about ten percent of an axial length of the tube extending between the first end and the second end of the tube, and the tube including at least one uncoated portion not covered by the segmented damping coating, the uncoated portion of the tube including greater than about ten percent of an axial length of the tube; and,
   c. wherein the segmented coating comprises polytetrafluoroethylene tolerant of temperatures in a range of between about 260 degrees Celsius and about 371.11 degrees Celsius and coated on the tube to a thickness that is no greater than about 0.636 millimeters.

13. The oscillating tube of claim 12, wherein the uncoated portion of the tube includes one of a first uncoated portion adjacent the first end of the tube, a second uncoated portion adjacent the second end of the tube and a first uncoated portion adjacent the first end of the tube and a second uncoated portion adjacent the second end of the tube.

14. The oscillating tube of claim 12, wherein the uncoated portion includes one of a linear segment, a radial segment, and a linear and a radial segment, wherein the linear segment extends parallel to a direction of flow of fluids through the tube and also extends adjacent a coated portion of the tube along the linear segment, and wherein the radial segment extends around the tube in a direction perpendicular to the flow of fluids through the tube.

15. The oscillating tube of claim 12, wherein the tube is secured between two components of a gas turbine engine.

16. The oscillating tube of claim 12, wherein the tube is integrated within an assembly secured within a gas turbine engine.

\* \* \* \* \*